(12) United States Patent
Baglin et al.

(10) Patent No.: US 12,185,268 B2
(45) Date of Patent: Dec. 31, 2024

(54) METHOD AND DEVICE FOR CORRECTING THE TIME DEFINED BY AN INTERNAL CLOCK OF AN ENTITY

(71) Applicant: RENAULT s.a.s., Boulogne-Billancourt (FR)

(72) Inventors: Matthieu Baglin, Tournefeuille (FR); Eric Perraud, Plaisance du Touch (FR)

(73) Assignee: AMPERE S.A.S., Boulogne-Billancourt (FR)

( * ) Notice: Subject to any disclaimer, the term of this patent is extended or adjusted under 35 U.S.C. 154(b) by 0 days.

(21) Appl. No.: 17/436,393

(22) PCT Filed: Feb. 3, 2020

(86) PCT No.: PCT/EP2020/052606
§ 371 (c)(1),
(2) Date: Sep. 3, 2021

(87) PCT Pub. No.: WO2020/187478
PCT Pub. Date: Sep. 24, 2020

(65) Prior Publication Data
US 2022/0132449 A1 Apr. 28, 2022

(51) Int. Cl.
| | |
|---|---|
| H04W 56/00 | (2009.01) |
| H04B 7/185 | (2006.01) |
| H04W 4/40 | (2018.01) |

(52) U.S. Cl.
CPC ...... *H04W 56/005* (2013.01); *H04B 7/18513* (2013.01); *H04W 56/0025* (2013.01); *H04W 4/40* (2018.02)

(58) Field of Classification Search
CPC . H04W 56/005; H04W 56/0025; H04W 4/40; H04W 64/00; H04W 56/002;
(Continued)

(56) References Cited

U.S. PATENT DOCUMENTS

| | | | |
|---|---|---|---|
| 9,392,565 B2 | 7/2016 | Shao et al. | |
| 2008/0048739 A1* | 2/2008 | Nakaya | H03L 7/0814 327/146 |

(Continued)

OTHER PUBLICATIONS

International Search Report dated Mar. 11, 2020 in PCT/EP2020/052606 (with English translation), 3 pages.
(Continued)

*Primary Examiner* — Ashley Shivers
(74) *Attorney, Agent, or Firm* — Oblon, McClelland, Maier & Neustadt, L.L.P.

(57) ABSTRACT

A method corrects the time defined by an internal clock of an entity capable of receiving signals from a satellite positioning system and of communicating with at least one other entity. When the signals do not allow the satellite positioning of the entity, the method includes: receiving, by the entity, a message originating from the other entity, the message including a first piece of time data associated with the instant the message was transmitted; determining, by the entity, a second piece of time data associated with the instant the message was received by the entity; calculating a time difference between the second piece of time data and the first piece of time data; and then, when the time difference is negative, determining a time correction to be made to the internal clock of the entity.

14 Claims, 2 Drawing Sheets

(58) Field of Classification Search
CPC .... H04W 4/46; H04B 7/18513; H04J 3/0641; H04J 3/0644; H04J 3/0664
See application file for complete search history.

(56) References Cited

U.S. PATENT DOCUMENTS

| | | |
|---|---|---|
| 2008/0082293 A1* | 4/2008 | Hochmuth .............. H04L 67/75 |
| | | 702/108 |
| 2011/0216747 A1 | 9/2011 | Shao et al. |
| 2017/0034800 A1 | 2/2017 | Abedini et al. |
| 2017/0280416 A1 | 9/2017 | Zalewski et al. |
| 2019/0053178 A1 | 2/2019 | Merwaday et al. |

OTHER PUBLICATIONS

"Remaining Details of SLSS Based Synchronization" NTT DOCOMO, 3GPP TSG RAN WG1 Meeting #87, R1-1612689, XP051176632, Nov. 13, 2016, pp. 1-6.

* cited by examiner

METHOD AND DEVICE FOR CORRECTING THE TIME DEFINED BY AN INTERNAL CLOCK OF AN ENTITY

TECHNICAL FIELD OF THE INVENTION

The present invention relates in general to the exchange of messages between entities of an intelligent transport system.

It relates in particular to the exchange of messages between a motor vehicle and any other entity.

It relates more particularly to a method for correcting the time defined by an internal clock of an entity able to receive signals from a satellite positioning system and to communicate with at least one other entity.

It also relates to a correction device for correcting the time defined by an internal clock of an entity able to receive data from a satellite positioning system and to communicate with at least one other entity.

PRIOR ART

The exchange of data between entities of an intelligent transport system (or ITS), for example between motor vehicles, using wireless communication systems, called "V2X", is nowadays an effective means for providing road participants (drivers and pedestrians) with information and early warnings about their surroundings, in particular concerning events taking place outside of their field of view.

In order for the events associated with the exchanged messages to be evaluated and interpreted effectively, the various entities of the intelligent transport system have to be temporally synchronized. This synchronization is performed for example by a common reference of a satellite positioning system (or GNSS for "Global Navigation Satellite System", going by the commonly used acronym). The messages containing the data are thus accurately timestamped, thereby allowing useful and coherent interpretation of these messages with respect to the surrounding context.

However, in some situations, it is not possible to implement temporal synchronization.

Document EP3138304 describes a method for generating a timestamp of events, transmitted through a message in a vehicle. In particular, this method is applicable in cases in which the reception of the GNSS signal is insufficient when the vehicle is started. In this case, the common reference for synchronization is unavailable, and the system in the vehicle will rely on a local time base to date the events associated with the messages that are received and sent.

According to that document, this local time base is determined based on the exchange of special messages, called "synchronization" messages, between the vehicle and another vehicle located in the same geographical region. These messages then comprise the timestamp information for defining the local time base.

That document also describes the possibility of taking into account multiple timestamps associated with multiple other vehicles located near the vehicle of interest in order to minimize the error in determining the local time base.

PRESENTATION OF THE INVENTION

The present invention proposes to improve the temporal synchronization between the entities of an intelligent transport system, in particular in the case where one of the entities is not able to receive signals from a satellite positioning system, in order to establish a common time base for all of the entities of the intelligent transport system.

More particularly, what is proposed according to the invention is a method for correcting the time defined by an internal clock of an entity as defined in the introduction, in which provision is made, when the signals do not allow satellite positioning of said entity (that is to say for example when said entity is located outside of the coverage of the satellite positioning system or when the quality of the signal from the satellite positioning system is not sufficient), for the following steps:

said entity receiving a message from said other entity, said message comprising a first item of time data associated with the transmission time of said message, said entity determining a second item of time data associated with the time of reception of said message by said entity, computing a time difference relating to the difference between the second item of time data and the first item of time data, and then determining a temporal correction to be made to the time defined by the internal clock of said entity on the basis of said time difference.

Thus, by virtue of the invention, when the entity is located outside of the coverage of a satellite positioning system (and therefore temporal synchronization with a common reference clock is not possible), the internal clock of the entity is able to be reliably corrected through a message received from another entity. Based on reading a timestamp of the received message, it is possible to determine a time difference between the internal clock of the entity and another clock linked to the other entity, this difference characterizing any drift of the internal clock of the entity under consideration. The internal clock of the entity under consideration may therefore be corrected on the basis of this determined difference.

Other advantageous and non-limiting features of the method according to the invention, these features being implemented individually or in any technically possible combination, are as follows:

if the time difference is negative, provision is made to modify the time defined by the internal clock of said entity, and if the time difference is positive, provision is made to maintain the time defined by the internal clock of said entity;

the step of determining a temporal correction comprises the following sub-steps: —determining a second updated item of time data such that a theoretical time difference between the second updated item of time data and the first item of data is equal to a determined value, and determining the temporal correction based on the second updated item of time data and on the second item of time data;

the determined value depends on the communication technology used to transmit said message;

the determined value depends on the type of the message;

the determined value depends on the security level of said message;

the determined value depends on an encoding duration of the message, said duration preferably being determined by computing an average value of encoding durations associated with a number of messages received by said entity prior to the reception of said message;

the determined value depends on a decoding duration of the message, said duration preferably being determined by computing an average value of decoding durations associated with a number of messages received by said entity prior to the reception of said message;

provision is also made for a step of correcting the internal clock of said entity on the basis of the determined temporal correction; and provision is also made, if the time difference is positive and greater than a predetermined threshold, for a step of transmitting an alert message concerning the reliability of said message.

The invention also proposes a correction device for correcting the time defined by an internal clock of an entity able to receive signals from a satellite positioning system and to communicate with at least one other entity. According to the invention, said correction device comprises a computer programmed, when the signals do not allow satellite positioning of said entity, to:

receive a message from the other entity, said message comprising a first item of time data associated with the transmission time of said message, determine a second item of time data associated with the time of reception of said message by said entity, compute a time difference relating to the difference between the second item of time data and the first item of time data, and then determine a temporal correction to be made to the time defined by the internal clock of said entity on the basis of said time difference.

Of course, the various features, variants and embodiments of the invention may be associated with one another in various combinations, provided that they are not incompatible with one another or mutually exclusive.

DETAILED DESCRIPTION OF THE INVENTION

The description that follows with reference to the appended drawings, which are given by way of non-limiting examples, will make it easy to understand what the invention consists of and how it may be implemented.

Figure 1:
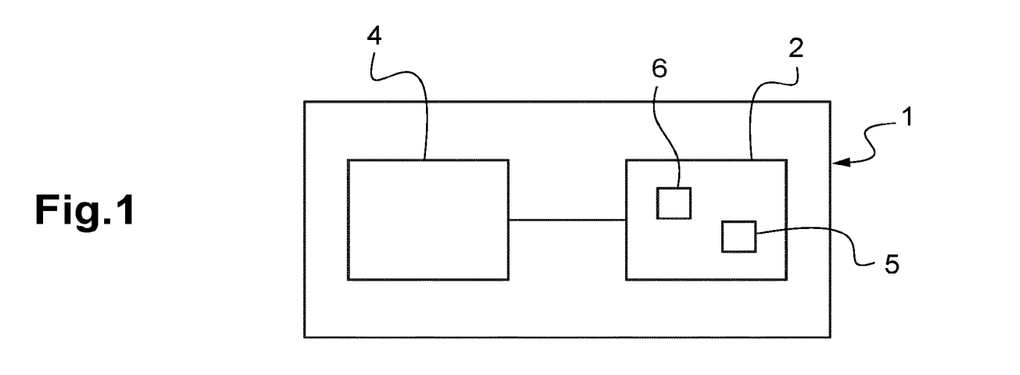
FIG. 1 schematically shows an entity equipped with a correction device according to the invention.

FIG. 1 schematically shows an entity 1 equipped with an internal clock 4 and with a correction device 2 for correcting this internal clock 4.

Figure 2:
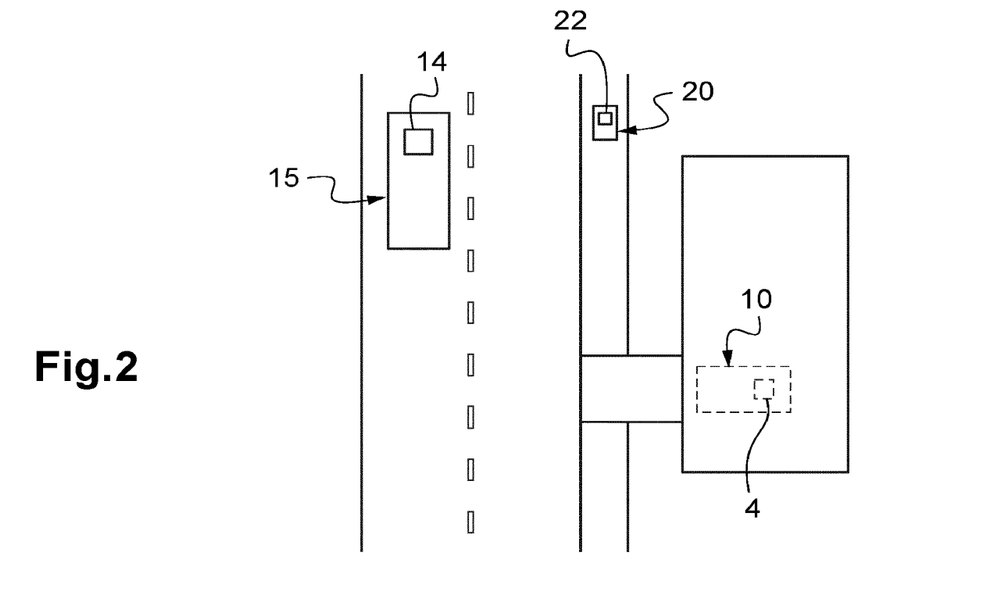
FIG. 2 schematically shows a data exchange situation in which the method according to the invention is able to be implemented.

This entity 1 is for example a vehicle, typically a motor vehicle 10 as shown in FIG. 2, or a two-wheeled vehicle or even a heavy goods vehicle. The entity 1 may also be a connected electronic element carried by a pedestrian, such as for example a mobile telephone.

The correction device 2 comprises a computer 5 and a communication unit 6.

The computer 5 is programmed to implement the various steps of the correction method described below. For this purpose, the computer 5 comprises for example a memory and a processor (both not shown) for storing and executing instructions in order to implement the correction method.

The communication unit 6 allows the entity 1 to communicate with at least one other entity. This other entity is separate from the entity 1. The other entity is for example another motor vehicle 15, as shown in FIG. 2. The other entity may also be a road infrastructure (equipped with another communication unit), typically a traffic light, a barrier, a tunnel or an electronic display panel positioned at a roundabout or by the roadside.

The communication unit 6 is designed to establish a radiofrequency connection between the entity 1 and the other entity. For example, if the entity 1 is a motor vehicle, the communication unit 6 is designed to establish what are known as "V2X" (for "Vehicle-to-Everything") wireless communications, for example "V2V" (for "Vehicle-to-Vehicle") wireless communications if the other entity is another motor vehicle 15, "V2I" (for "Vehicle-to-Infrastructure") wireless communications if the other entity is an infrastructure, or "V2P" (for "Vehicle-to-Pedestrian") wireless communications if the other entity is being carried by a pedestrian.

Various technologies may be used to establish radiofrequency communication. For example, dedicated short-range communications (or DSRC, going by the commonly used acronym) may be used here, based on the IEEE 802.11p standard. PC5 mode 4 technology stemming from cellular technologies and based on the 3GPP version 14 standard may also be used within the context of the invention, for example to establish radiofrequency communication between vehicles without transiting via the cellular infrastructure.

The communication unit 6 is designed here to allow the exchange of data between the entity 1 and the other entity. These data are exchanged in the form of messages that are exchanged between the entity 1 and the other entity, and vice versa.

Considering that the entity 1 is the motor vehicle 10, and within the context of "V2X" communications, various types of message may be exchanged.

For example, CAM (for "Cooperative Awareness Message") messages are intended, in real time, to locate vehicles and infrastructures with respect to one another. CAM messages therefore comprise information concerning the position and the state of vehicles. CAM messages are transmitted periodically by entities present in an intelligent transport system and are transmitted and processed by all of the entities within range of the transmitting entities.

DENM (for "Decentralized Environmental Notification Messages") messages are alert messages intended to be broadcast in a geographical region. They are transmitted only when an unexpected event occurs, such as for example the presence of an accident, roadworks or traffic jams. These messages therefore have a priority nature when they are transmitted (compared to all other types of message), so as to immediately alert the various road users about the presence of the identified event.

Other types of message are also exchanged, such as, in a non-exhaustive manner, MAP messages transmitting geographical data, SPAT (for "Signal Phase and Timing") messages transmitting information about the current state of and upcoming changes to road signs such as traffic lights or CPM (for "Collective Perception Message") messages comprising data originating from the sensors of a motor vehicle.

The communication unit 6 is also designed to allow the entity 1 to receive signals from a satellite positioning system (called "GNSS", such as for example the GPS system); these signals comprise for example data concerning the position of the entity 1. The entity 1 is therefore intended to be generally located within the coverage of the satellite positioning system.

The satellite positioning system comprises for example a reference clock, used to calibrate and adjust the internal clock 4 of the entity 1. The internal clock 4 is designed to measure time and define the time in the entity 1.

When the entity 1 is within the coverage of the satellite positioning system and the transmitted signals are sufficient, this positioning system transmits for example a message comprising a reference item of time data for adjusting the time of the internal clock 4 of the entity 1. The time of the internal clock 4 of the entity 1 is therefore adjusted based on the transmitted reference item of time data.

Similarly, considering that the other entity is equipped with another internal clock, the time of this other internal clock is also adjusted based on the reference item of time data (when the other entity is within the coverage of the satellite positioning system). In other words, this reference item of time data makes it possible to adjust all of the internal clocks of the various entities. This reference item of time data therefore constitutes an absolute reference for each internal clock and therefore allows all of the internal clocks to be temporally synchronized.

In practice, within the context of exchanging data with other entities, the internal clock 4 makes it possible to timestamp the messages received and transmitted by the entity 1.

The invention proposes a method for reliably characterizing the internal clock 4 of the entity 1 when the signals do not allow satellite positioning of said entity 1. In practice, this means for example that the entity 1 is not within the coverage of the satellite positioning system (and therefore that it is not possible to ensure temporal synchronization of the internal clock 4) or that the quality of the signal from the satellite positioning system is not sufficient.

Figure 3:
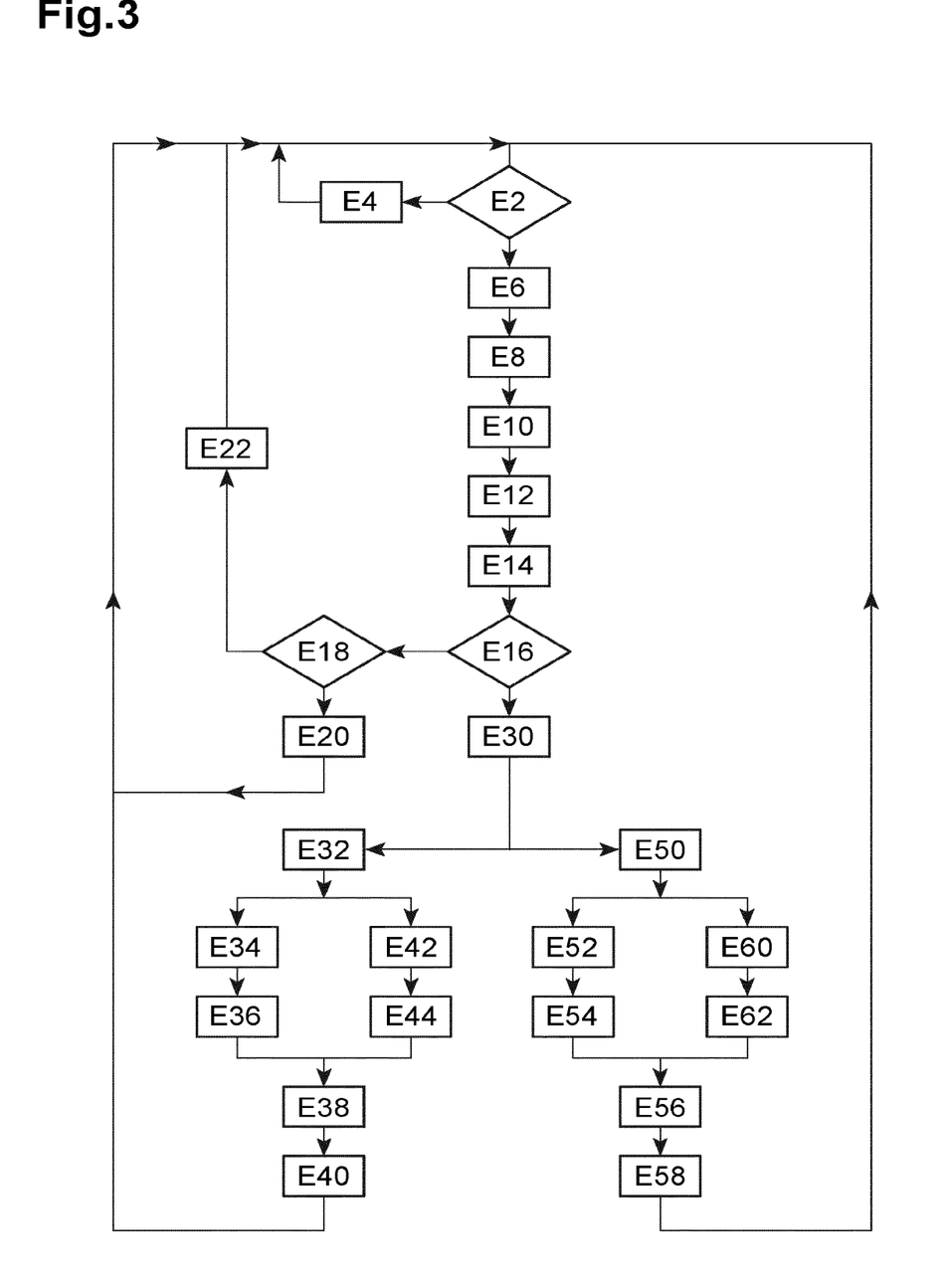
FIG. 3 shows one example of a correction method according to the invention, in the form of a flowchart.

FIG. 3 shows one exemplary embodiment of the method for correcting the internal clock 4 of the entity 1, illustrated in the form of steps. This method is advantageously applied when the entity 1 is located outside of the coverage of the satellite positioning system.

In the remainder of this description, it will be considered that the entity 1 is a motor vehicle 10 and that the other entity is another motor vehicle 15 that is itself located within the coverage of the satellite positioning system (FIG. 2). However, the present method is not limited to this configuration, and could concern all types of entity comprising the features described above.

As shown in FIG. 3, the method starts at step E2. In this step, the computer determines whether the motor vehicle 10 is within the coverage of the positioning system.

If so, temporal synchronization is ensured, for example through the periodic reception of messages comprising the reference item of time data. This makes it possible in particular to update the internal clock 4 of the motor vehicle 10.

In this case, the method then continues at step E4, in which, as the motor vehicle 10 travels along its route, the computer 5 generates and sends new messages to other entities present near the motor vehicle 10.

The method then restarts at step E2, so as to be implemented in a loop when the motor vehicle 10 is moving.

If, in step E2, the computer 5 detects that the motor vehicle 10 is not within the coverage of the positioning system, the method continues at step E6. This corresponds for example to the situation shown in FIG. 2, in which the motor vehicle 10 is parked in an enclosed place, such as a tunnel or an underground car park, which does not allow reception of a signal from the satellite positioning system. In the example of FIG. 2, the motor vehicle 10 is parked in a garage and the computer 5 implements the method when the motor vehicle 10 is started.

In step E6, the computer 5 then commands stopping of the transmission of messages by the motor vehicle 10 since, a priori, it is not possible to perform reliable timestamping of the messages (since the motor vehicle 10 is not within the coverage of the satellite positioning system). However, it continues to receive messages.

Then, in step E8, the computer 5 receives a message. This message originates from another entity present near the motor vehicle 10. This message is transmitted via a radiofrequency connection, for example in accordance with the DSRC 802.11p or PC5 standards introduced above.

In the example of FIG. 2, the message is for example transmitted by the other motor vehicle 15. As a variant, the message may be transmitted from a mobile terminal 22 carried by a pedestrian 20 or by an infrastructure designed to communicate in accordance with the DSRC or PC5 standards introduced above.

Upon receiving the message, the computer 5 determines the reception time $T_r$ based on the internal clock 4 of the motor vehicle 10 (step E10).

In step E12, the computer 5 reads the information stored in the received message. In particular, the computer 5 determines the information concerning the transmission time $T_e$ of the message. The timestamping linked to the transmission of the message is performed by the internal clock 14 of the other motor vehicle 15, prior to the reception step E8. Since the other vehicle 15 is able to transmit messages (since one of them was received by the motor vehicle 10 at step E8), this means that it is within the coverage of the positioning system or that it is capable of keeping an internal clock synchronous with the reference clock with sufficient accuracy; the timestamping of the transmission of the message is therefore considered to be reliable.

At step E14, the computer 5 determines a time difference $\Delta T$ between the reception time $T_r$ and the transmission time $T_e$ of the message. This time difference is defined here as the difference between the reception time $T_r$ and the transmission time $T_e$ of the message: $\Delta T = T_r - T_e$. This time difference $\Delta T$ makes it possible to detect and evaluate any offset between the internal clock 4 of the motor vehicle 10 and the internal clock 14 of the other motor vehicle 15 (for which, as specified above, temporal synchronization is ensured). In other words, the time difference $\Delta T$ makes it possible to measure any drift of the internal clock 4 of the motor vehicle 10 with respect to a reference clock associated with the satellite positioning system.

To detect any drift of the internal clock 4, the sign of the time difference $\Delta T$ is considered in step E16.

If the time difference $\Delta T$ is positive, this means that the message was received after having been transmitted (this being logical in a data exchange process). The internal clock 4 is therefore considered to be reasonably temporally synchronized (if the internal clock 4 has drifted, this drift is considered to be negligible). The internal clock 4 of the entity 1 is therefore maintained as it is (no adjustment is performed in this case).

The method then continues at step E18. In this step, the time difference $\Delta T$ is compared with a predetermined message reliability threshold. The predetermined message reliability threshold is for example of the order of 200 ms. If the time difference $\Delta T$ is greater than this predetermined threshold, this means that a lengthy duration has elapsed between the transmission time $T_e$ and the reception time $T_r$ of the message. Doubts concerning the reliability of the message are therefore raised, and the computer 5 therefore transmits an alert message in this regard (step E20). This occurs for example when the other internal clock 14 of the other motor vehicle 15 is ultimately not appropriately temporally synchronized. The message is therefore not formatted so as to be transmitted, for example, to the driver of the motor vehicle 10. The method then resumes at step E2.

If the time difference ΔT is positive but lower than the predetermined threshold, the internal clock 4 is considered to be temporally synchronized and the message is considered to be reliable (a normal duration has elapsed between the transmission time $T_e$ and the reception time $T_r$ of the message). The computer 5 again authorizes the generation and transmission of messages by the motor vehicle 10 (step E22).

If, at step E16, the time difference ΔT was evaluated as being negative, this means that the message is considered to have been received before having been transmitted, this not being consistent with a conventional message transmission process. The computer 5 therefore detects drifting of the internal clock 4 of the motor vehicle 10, which it will then seek to correct.

As may be seen in FIG. 3, the method continues at step E30. In this step, the computer 5 determines the type of radiofrequency link that allowed the message to be transmitted from the other motor vehicle 15 to the motor vehicle 10.

If the radiofrequency communication is DSRC radiofrequency communication, the method continues at step E32. At this step, the computer 5 identifies the type of message that was received at step E8.

If this is a DENM message, the method continues at step E34.

The computer 5 then seeks to determine the temporal correction to be made to the internal clock 4 in order to compensate for the drift identified in step E16. For this purpose, at step E34, the computer 5 computes an expected theoretical time difference $\Delta T_{th\_DENM}$ corresponding to correct temporal synchronization of the internal clock 4 and transmission of the message within a reasonable duration.

This theoretical time difference $\Delta T_{th\_DENM}$ is broken down into the following form:

$\Delta T_{th\_DENM} = T_{enc\_DENM} + T_{dec\_DENM} + T_{radio\_DENM}$, where $T_{enc\_DENM}$ is the duration required to encode the message before it is transmitted, $T_{dec\_DENM}$ is the duration to decode the message after it has been transmitted, and $T_{radio\_DSRC\_DENM}$ is the duration of access to the radiofrequency transmission channel (associated here with the DSRC communication) and of transmission.

The encoding duration $T_{enc\_DENM}$ depends on the security level of the message. For a given security level of the message, this encoding duration is assumed to be equal to a known value. Here, to determine the encoding duration $T_{enc\_DENM}$ associated with a received DENM message, the computer 5 computes an average value of the encoding durations associated with a number N of DENM messages received by the motor vehicle 10 prior to step E8. Preferably, the average value is determined based on the last N DENM messages received (N being an integer greater than or equal to two). This average value is computed based on messages having the same security level as the one received at step E8.

The decoding duration $T_{dec\_DENM}$ also depends on the security level of the message. For a given security level of the message, this decoding duration is assumed to be equal to a known value. Here, to determine the decoding duration $T_{dec\_DENM}$ associated with a received DENM message, the computer 5 computes an average value of the decoding durations associated with a number N of DENM messages received by the motor vehicle 10 prior to step E8. Preferably, the average value is determined based on the last N DENM messages received. In the same way as for the estimate of the encoding duration $T_{enc\_DENM}$, this average value is computed based on messages having the same security level as the one received in step E8.

The duration of access to the radiofrequency transmission channel and of transmission $T_{radio\_DSRC\_DENM}$ (also called radiofrequency communication duration $T_{radio\_DSRC\_DENM}$ hereinafter) for its part comprises two components: a first one associated with the duration required to access the radiofrequency channel $T_{acc\_DENM}$ and a second one associated with a transmission duration $T_{trans\_DENM}$.

The transmission duration $T_{trans\_DENM}$ is estimated based on the average size of a DENM message, noted $S_{avg\_DENM}$, determined for example considering the last N DENM messages received, and on the transmission speed of a DENM message $v_{DENM}$. The transmission speed of a DENM message $v_{DENM}$ here is typically of the order of 6 Mbit/s. The transmission duration $T_{trans\_DENM}$ is thus equal to: $T_{trans\_DENM} = S_{avg\_DENM}/v_{DENM}$.

The duration required to access the radiofrequency channel $T_{acc\_DENM}$ for its part depends on a duration associated with the detection of the priority nature of the message $T_{LBT\_DENM}$ (LBT for "Listen-Before-Talk"), on a duration that has elapsed between two data transmissions $T_{AIFS\_DENM}$ (AIFS for "Arbitration inter-frame space") for this type of message and on a duration $T_{CW\_DENM}$ (CW for "Contention Window") qualifying the time period for which a communication channel is capable of processing requests arriving simultaneously before being in an overburdened state.

Here, as specified above, the DENM messages are transmitted with priority over the other types of message. The duration associated with the detection of the priority nature of the message $T_{LBT\_DENM}$ will therefore depend only on the presence of other DENM messages to be transmitted. However, since the occurrence of DENM messages is infrequent, the duration associated with the detection of the priority nature of the message $T_{LBT\_DENM}$ is negligible for a DENM message. The duration $T_{LBT\_DENM}$ here is therefore considered to be zero.

By convention, the duration that has elapsed between two data transmissions $T_{AIFS\_DENM}$ is equal to a predetermined value, typically here of the order of 58 μs. Finally, the duration $T_{CW\_DENM}$ is determined randomly within a predetermined interval. This interval extends for example between 0 and 39 μs.

Finally here, the duration required to access the radiofrequency channel $T_{acc\_DENM}$, equal to $T_{acc\_DENM} = T_{LBT\_DENM} + T_{AIFS\_DENM} + T_{CW\_DENM}$, is between 58 and 97 μs. In the case of a received DENM message, the computer 5 sets this to an arbitrary value, typically of the order of 0.1 ms.

The theoretical time difference is thus equal to:

$$\Delta T_{th\_dENM} = T_{enc\_DENM} + T_{dec\_DENM} + T_{radio\_DSRC\_DENM} =$$
$$T_{enc\_DENM} + T_{dec\_DENM} + T_{acc\_DENM} + T_{trans\_DENM} =$$
$$T_{enc\_DENM} + T_{dec\_DENM} + T_{LBT\_DENM} +$$
$$T_{AIFS\_DENM} + T_{CW\_DENM} + S_{avg\_DENM}/v_{DENM}.$$

This determination of the expected theoretical time difference in the case of correct temporal synchronization of the internal clock 4 makes it possible to deduce an expected reception time $T_{ra}$ of the received message (corresponding to the reception time determined if the internal clock 4 were to have been suitably synchronized), specifically $T_{ra} - T_e = \Delta T_{th\_DENM}$.

At step E36, the temporal correction $\varepsilon_T$ to be made to the internal clock 4 is therefore determined based on the reception time $T_r$ of the received message (determined at step E10) and on the expected reception time $T_{ra}$ (determined at step E34). This temporal correction $\varepsilon_T$ is defined as the difference between the reception time $T_r$ and the expected reception time $T_{ra}$: $\varepsilon_T = T_r - T_{ra}$.

At step E38, the computer 5 corrects the time defined by the internal clock 4 of the motor vehicle 10 based on the determined temporal correction $\varepsilon_T$. At the end of this step E38, the internal clock 4 is considered to be temporally synchronized again. Messages are again transmitted by the motor vehicle 10 at step E40. The method then resumes at step E2, throughout the movement of the motor vehicle 10.

If, at step E32, a CAM message has been identified, the method continues at step E42.

Similarly to step E34 described for a DENM message, the computer 5 determines, here in the case of a CAM message, the temporal correction to be made to the internal clock 4 in order to compensate for the drift identified in step E16. For this purpose, the computer 5 computes an expected theoretical time difference $\Delta T_{th\_CAM}$ corresponding to correct temporal synchronization of the internal clock 4 and transmission of the message within a reasonable duration.

This theoretical time difference $\Delta T_{th\_CAM}$ is broken down into the form introduced above: $\Delta T_{th\_CAM} = T_{enc\_CAM} + T_{dec\_CAM} + T_{radio\_DSRC\_CAM}$.

The decoding duration $T_{dec\_CAM}$ is defined in a manner similar to the case corresponding to the DENM message. The decoding duration $T_{dec\_CAM}$ depends on the security level of the message. For a given security level of the message, this decoding duration is assumed to be equal to a known value. Here, to determine the decoding duration $T_{dec\_CAM}$ associated with a received CAM message, the computer 5 computes an average value of the decoding durations associated with a number N' of CAM messages received by the motor vehicle 10 prior to step E8. Preferably, the average value is determined based on the last N' CAM messages received (N' being a natural integer greater than or equal to 2). This average value is computed based on messages having the same security level as the one received at step E8.

The encoding duration $T_{enc\_CAM}$ also depends on the security level of the message. For a given security level of the message, this encoding duration is assumed to be equal to a known value. Here, to determine the encoding duration $T_{enc\_CAM}$ associated with a received CAM message, the computer 5 computes an average value of the encoding durations associated with a number N' of CAM messages received by the motor vehicle 10 prior to step E8, and also takes into account an average injection duration $T_{inj}$ of the CAM messages (reflecting the fact that, as indicated above, CAM messages are transmitted periodically). Preferably, the average value is determined based on the last N' CAM messages received. This average value is computed based on messages having the same security level as the one received at step E8. The average injection duration $T_{inj}$ of the CAM messages for its part depends on a transmission interval $T_{int\_trans}$ of CAM messages, itself dependent on the speed of the motor vehicle 10. Here, this average injection duration $T_{inj}$ is equal to $T_{inj} = T_{int\_trans}/2$.

In the same way as for DENM messages, the radiofrequency communication duration $T_{radio\_DSRC\_CAM}$ comprises the two components: the first one associated with the duration required to access the radiofrequency channel $T_{acc\_CAM}$ and the second one associated with a transmission duration $T_{trans\_CAM}$.

The transmission duration $T_{trans\_CAM}$ is estimated based on the average size of a CAM message, denoted $S_{avg\_CAM}$, determined for example considering the last N' CAM messages received, and on the transmission speed of a CAM message $v_{CAM}$. The transmission speed of a CAM message $v_{CAM}$ here is typically of the order of 6 Mbit/s. The transmission duration $T_{trans\_CAM}$ is thus equal to: $T_{trans\_CAM} = S_{avg\_CAM}/v_{CAM}$.

The duration required to access the radiofrequency channel $T_{acc\_CAM}$ comprises the components described above, specifically a duration $T_{LBT\_CAM}$ for which the radiofrequency channel is inaccessible as it is occupied by transmissions of CAM messages from other entities, a duration that has elapsed between two data transmissions $T_{AIFS\_CAM}$, and a duration $T_{CW\_CAM}$ qualifying the time period for which a communication channel is capable of processing requests arriving simultaneously before being in an overburdened state.

Here, the duration $T_{LBT\_CAM}$ associated with the detection of the availability of the radiofrequency channel is modeled by evaluating an average duration $T_{avg\_CAM}$ of CAM messages from other entities and a probability $P_{trans\_CAM}$ of a CAM message currently being transmitted, using the following formula: $T_{LBT\_CAM} = T_{avg\_CAM} * P_{trans\_CAM}$.

In practice, the average duration $T_{avg\_CAM}$ is estimated based on the cumulative size $S_{tot\_CAM}$ of the CAM messages over an observation window, on the transmission speed of a CAM message $v_{CAM}$ (typically of the order of 6 Mbits/s) and on the number of CAM messages $N_{CAM}$ counted over this observation window. The average duration $T_{avg\_CAM}$ is thus written in the following form: $T_{avg\_CAM} = (S_{tot\_CAM}/v_{CAM})/N_{CAM}$. The probability $P_{trans\_CAM}$ of transmission is given as the ratio between the average duration $T_{avg\_CAM}$ and the size (in seconds) of the observation window.

By convention, for CAM messages, the duration that has elapsed between two data transmissions $T_{AIFS\_CAM}$ is equal to a predetermined value, typically here of the order of 110 µs. Finally, the duration $T_{CW\_CAM}$ is determined randomly within a predetermined interval. This interval extends for example here between 0 and 195 µs.

Finally here, in the case of a received CAM message, the computer 5 sets the sum of the durations $T_{AIFS\_CAM} + T_{CW\_CAM}$ to an arbitrary value. This arbitrary value is typically of the order of 0.2 ms.

The theoretical time difference may thus be computed as follows:

$$\Delta T_{th\_CAM} = T_{enc\_CAM} + T_{dec\_CAM} + T_{radio\_DSRC\_CAM} =$$
$$T_{enc\_CAM} + T_{dec\_CAM} + T_{acc\_CAM} + T_{trans\_CAM} = T_{enc\_CAM} +$$
$$T_{dec\_CAM} + T_{LBT\_CAM} + T_{AIFS\_CAM} + T_{CW\_CAM} + S_{avg\_CAM}/v_{CAM}$$

with each term as defined above.

In the same way as in the case of DENM massages, this determination of the expected theoretical time difference in the case of correct temporal synchronization of the internal clock 4 makes it possible to deduce an expected reception time $T_{ra}$ of the received message (corresponding to the reception time determined if the internal clock 4 were to have been suitably synchronized).

At step E44 (similar to step E36 described above), the temporal correction $E_T$ to be made to the time defined by the internal clock 4 is therefore determined based on the reception time $T_r$ of the received message (determined in step E10) and on the expected reception time $T_{ra}$ (determined in step E42). This temporal correction $\varepsilon_T$ is defined as the difference between the reception time $T_r$ and the expected reception time $T_{ra}$: $\varepsilon_T = T_r - T_{ra}$. The method then continues with step E38 described above.

If, at step E30, it is detected that the radiofrequency communication is PC5 radiofrequency communication, the method continues at step E50. In the same way as in the above-described case of DSRC radiofrequency communication, at step E50 (similar to step E32), the computer 5 identifies the type of the message that was received at step E8.

If this is a DENM message, the method continues at step E52.

The computer 5 seeks to determine the temporal correction to be made to the internal clock 4 in order to compensate for the drift identified in step E16. For this purpose, in step E52, the computer 5 computes the expected theoretical time difference $\Delta T_{th\_DENM}$ corresponding to correct temporal synchronization of the internal clock 4 and transmission of the message within a reasonable duration.

In comparison with the case of DSRC radiofrequency communication, only the duration of access to the radiofrequency transmission channel (here associated with PC5 communication) and of transmission $T_{radio\_PC5\_DENM}$ changes when computing the theoretical time difference $\Delta T_{th\_DENM}$. The determination of the other terms is therefore not described again here.

In PC5 radiofrequency communication, a message is transmitted in a determined time window. This determined time window is for example of the form [4; $T_{max\_trans\_DENM}$], expressed in milliseconds.

In practice, the size of the determined time window depends on the type of message received. It may also depend on an occupancy rate of the communication channel CBR (for "Channel Busy Ratio"). The higher the occupancy rate, the longer the time window will be (in order to reduce the risk of collision resulting from the fact that two different entities might select the same communication channel to transmit their respective messages).

Within the context of the invention, the maximum value $T_{max\_trans\_DENM}$ of the time window is determined based on a function $f_{DENM}(CBR)$ associated with the type of message (here DENM) and depending on the occupancy rate of the communication channel CBR. For a low occupancy rate of the communication channel CBR, this function $f_{DENM}(CBR)$ is for example constant, typically of the order of 20 ms. For a high occupancy rate of the communication channel CBR, the function $f_{DENM}(CBR)$ is for example constant, typically of the order of 100 ms.

Thus, in order to determine the duration of access to the radiofrequency transmission channel and of transmission $T_{radio\_PC5\_DENM}$, the computer 5, at step E52, reads the occupancy rate of the communication channel CBR, and then deduces therefrom the maximum value $T_{max\_trans\_DENM}$ of the time window. The duration of access to the radiofrequency transmission channel and of transmission $T_{radio\_PC5\_DENM}$ is then defined as being the middle of this time window: $T_{radio\_PC5\_DENM} = (4 + f_{DENM}(CBR))/2$.

The computer 5 then determines the theoretical time difference $\Delta T_{th\_DENM}$, and then the expected reception time $T_{ra}$ using the method described at step E36. The method then continues with steps E54 to E58, which are similar to steps E36 to E40 described above.

If, at step E50, a CAM message has been identified, the method continues at step E60.

The computer 5 again seeks to determine the temporal correction to be made to the internal clock 4 in order to compensate for the drift identified in step E16. For this purpose, in step E60, the computer 5 computes the expected theoretical time difference $\Delta T_{th\_CAM}$ corresponding to correct temporal synchronization of the internal clock 4 and transmission of the message within a reasonable duration.

In comparison with the case of DSRC radiofrequency communication (and as specified for DENM messages), only the duration of access to the radiofrequency transmission channel (here associated with PC5 communication) and of transmission $T_{radio\_PC5\_CAM}$ changes when computing the theoretical time difference $\Delta T_{th\_CAM}$. The determination of the other terms is therefore not described again here.

In the same way as for the case of DENM messages, in PC5 radiofrequency communication, a message is transmitted in a determined time window. This determined time window is for example of the form [4; $T_{max\_trans\_CAM}$].

Within the context of the invention, the maximum value $T_{max\_trans\_CAM}$ of the time window is determined based on a function $f_{CAM}(CBR)$ associated with the type of message (here CAM) and depending on the occupancy rate of the communication channel CBR. For a low occupancy rate of the communication channel CBR, this function $f_{CAM}(CBR)$ is for example constant, typically of the order of 20 ms. For a high occupancy rate of the communication channel CBR, the function $f_{CAM}(CBR)$ is for example constant, typically of the order of 100 ms.

Thus, in order to determine the duration of access to the radiofrequency transmission channel and of transmission $T_{radio\_PC5\_CAM}$, the computer 5, at step E60, reads the occupancy rate of the communication channel CBR, and then deduces therefrom the maximum value $T_{max\_trans\_CAM}$ of the time window. The duration of access to the radiofrequency transmission channel and of transmission $T_{radio\_PC5\_CAM}$ is then defined as being the middle of this time window: $T_{radio\_PC5\_CAM} = (4 + f_{CAM}(CBR))/2$.

The computer 5 then determines the theoretical time difference $\Delta T_{th\_CAM}$, and then the expected reception time $T_{ra}$ using the method described at step E42. The method then continues with steps E62, E56 and E58, which are similar, respectively, to steps E44, E38 and E40 described above.

The present invention is in no way limited to the embodiments that have been described and shown, but a person skilled in the art will know how to add any variant thereto according to the invention.

When the determined value depends on the security level of said message, it depends more specifically on the encoding time that is linked to the security level of said message.

If multiple other entities are communicating simultaneously with the entity 1, all of the communicated messages are received, without the need to question the other entities or to choose a single other entity. The minimum negative latency is then chosen, that is to say the minimum negative time difference $\Delta T$ out of all those of the received messages, thereby making it possible to correct the internal clock with the greatest time difference.

The invention makes it possible not to add any additional message, but to use the payload of the existing upper layer protocol, which contains a synchronization reference completely independent of the physical layer implementation. This makes it possible to use a timestamp that is not linked to the transmission technology of the physical layer, but that is inside the payload of the message, since the message contains, in its payload, a first item of time data $T_e$ associated with the transmission time of the message. Another advantage is therefore that of taking into account the exact transmission delay when calibrating the internal clock, by virtue of knowing the transmission time $T_e$ and reception time $T_r$.

The invention claimed is:

1. A method for correcting the time defined by an internal clock of an entity configured to receive signals from a satellite positioning system having a reference clock and to communicate with at least one other entity, wherein, when the signals do not allow satellite positioning of said entity based on the entity not being within coverage of the satellite positioning system, said method comprises:
stopping allowance of transmission of messages from the entity while allowing the entity to continue to receive messages;
receiving, by said entity, a message from said other entity, said message comprising a first item of time data associated with a transmission time of said message and a timestamp indicating that said other entity is within coverage of the satellite positioning system, wherein said other entity has another internal clock synchronous with said reference clock of said satellite positioning system, and wherein said first item of time data is associated with said another internal clock;
determining, by said entity, a second item of time data associated with the time of the receiving said message by said entity;
computing a time difference relating to a difference between the second item of time data and the first item of time data;
determining a temporal correction to be made to the time defined by the internal clock of said entity based on said time difference; and
allowing the entity to resume transmission of messages.

2. The method as claimed in claim 1, wherein:
when the time difference is negative, provision is made to modify the time defined by the internal clock of said entity, and
when the time difference is positive, provision is made to maintain the time defined by the internal clock of said entity.

3. The method as claimed in claim 1, further comprising correcting the internal clock of said entity based on the determined temporal correction.

4. The method as claimed in claim 1, further comprising transmitting, when the time difference is positive and greater than a predetermined threshold, an alert message concerning the reliability of said message.

5. A method for correcting the time defined by an internal clock of an entity configured to receive signals from a satellite positioning system and to communicate with at least one other entity, wherein, when the signals do not allow satellite positioning of said entity, said method comprises:
receiving, by said entity, a message from said other entity, said message comprising a first item of time data associated with a transmission time of said message;
determining, by said entity, a second item of time data associated with the time of the receiving said message by said entity;
computing a time difference relating to a difference between the second item of time data and the first item of time data; and then
determining a temporal correction to be made to the time defined by the internal clock of said entity based on said time difference,
wherein the determining the temporal correction comprises:
determining a second updated item of time data such that a theoretical time difference between the second updated item of time data and the first item of data is equal to a determined value, and
determining the temporal correction based on the second updated item of time data and on the second item of time data.

6. The method as claimed in claim 5, wherein the determined value depends on the communication technology used to transmit said message.

7. The method as claimed in claim 6, wherein the the communication technology used to transmit said message is one of dedicated short-range communications (DSRC) and PC5.

8. The method as claimed in claim 5, wherein the determined value depends on the type of the message.

9. The method as claimed in claim 8, wherein the type of the message is at least one of a Cooperative Awareness Message (CAM) and a Decentralized Environmental Notification Message (DENM).

10. The method as claimed in claim 5, wherein the determined value depends on the security level of said message.

11. The method as claimed in claim 10, wherein the security level of said message is linked to an encoding time.

12. The method as claimed in claim 5, wherein the determined value depends on an encoding duration of the message, said duration being determined by computing an average value of encoding durations associated with a number of messages received by said entity prior to the reception of said message.

13. The method as claimed in claim 5, wherein the determined value depends on a decoding duration of the message, said duration being determined by computing an average value of decoding durations associated with a number of messages received by said entity prior to the reception of said message.

14. A correction device for correcting the time defined by an internal clock of an entity configured to receive signals from a satellite positioning system having a reference clock and to communicate with at least one other entity, said correction device comprising:
a computer programmed, when the signals do not allow satellite positioning of said entity, to:
stop allowance of transmission of messages from the entity while allowing the entity to continue to receive messages;
receive a message from the other entity, said message comprising a first item of time data associated with the transmission time of said message, wherein said other entity has another internal clock synchronous with said reference clock of said satellite positioning system, and wherein said first item of time data is associated with said another internal clock;
determine a second item of time data associated with the time of reception of said message by said entity;
compute a time difference relating to the difference between the second item of time data and the first item of time data;
determine a temporal correction to be made to the time defined by the internal clock of said entity based on said time difference; and
allow the entity to resume transmission of messages.

* * * * *